June 30, 1953 G. A. CONNELL 2,643,947
SUPERSATURATED BORAX SOLUTIONS AND METHODS
AND COMPOSITIONS FOR PRODUCING SAME
Filed Sept. 26, 1949
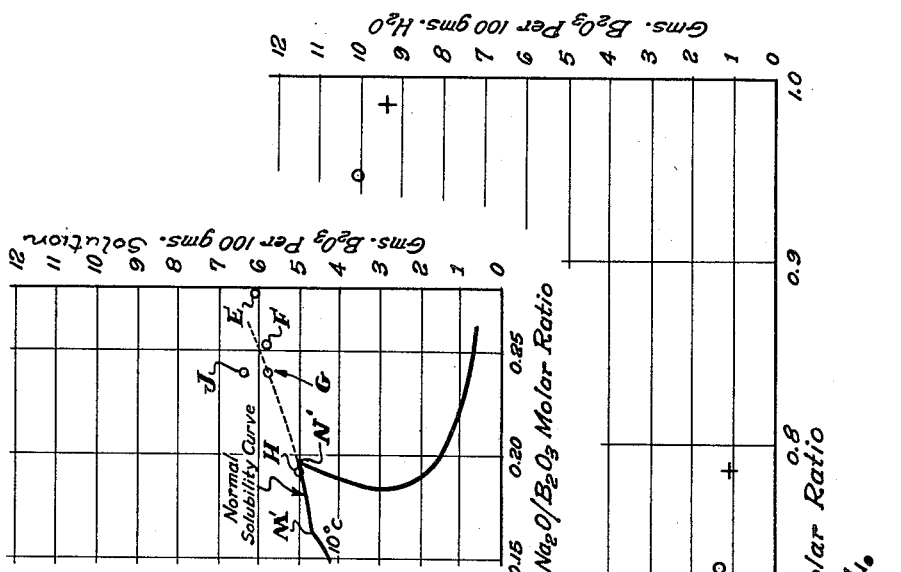
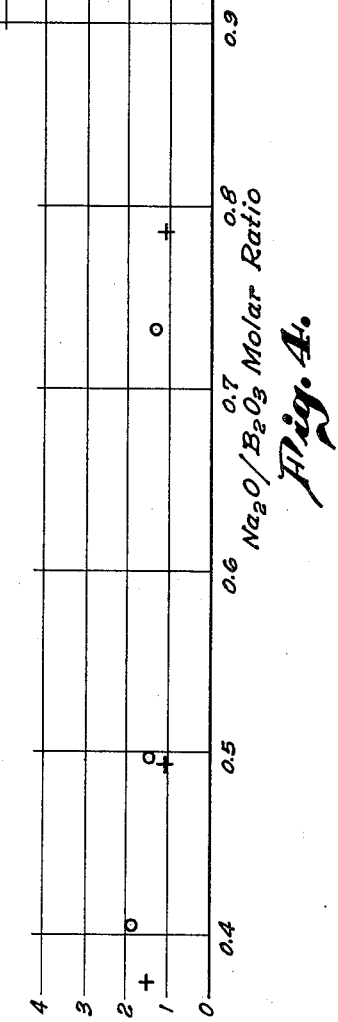
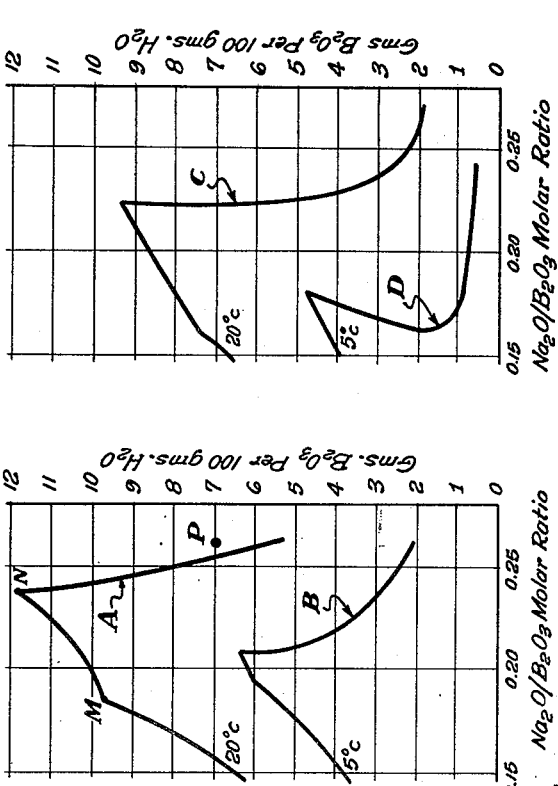
GEORGE A. CONNELL,
INVENTOR
BY Barkalow & Scantlebury
ATTORNEYS Patented June 30, 1953

2,643,947

UNITED STATES PATENT OFFICE 2,643,947

SUPERSATURATED BORAX SOLUTIONS AND METHODS AND COMPOSITIONS FOR PRODUCING SAME

George A. Connell, Los Angeles, Calif., assignor to Borax Consolidated, Limited, London, England, a corporation of Great Britain and Northern Ireland Application September 26, 1949, Serial No. 117,878

10 Claims. (Cl. 71—2.2)

This invention is concerned generally with the production of aqueous solutions containing borax in a higher concentration than corresponds to the normal solubility of that substance.

More particularly, but not exclusively, the invention has to do with solutions that are suitable for controlling the growth of weeds. For that purpose solutions of sodium metaborate are well known, either with or without sodium chlorate.

The effectiveness of a solution for weed control is ordinarily greater the higher the concentration of active ingredient. For economic reasons it is usually preferable for the user to make up weed control solutions as needed from chemicals in solid form. One aspect, then, of the problem of producing a borate solution of maximum utility for weed control is to provide a solid composition that will dissolve readily to a relatively high concentration under a wide range of conditions such as are encountered in the field. Such a composition is provided by the present invention.

Other objects and advantages of the invention will be understood from the following description of certain illustrative examples of various embodiments of the invention. In the drawings, which form a part of that description, Figs. 1 and 2 represent in graphical form the normal solubility of the system $Na_2O$—$B_2O_3$ in water and in an aqueous solution of sodium chlorate, respectively; and Figs. 3 and 4 represent in graphical form the compositions of certain solutions illustrative of the invention.

The normal solubility of the system $$Na_2O—B_2O_3$$

under given conditions may be specified in terms of the concentration of $B_2O_3$ in a solution in equilibrium with a solid phase. In Fig. 1 curve A shows the variation of that measure of the solubility of that system for a temperature of 20° C., plotted as a function of the molar ratio of $Na_2O/B_2O_3$ in solution. The corresponding function at 5° C. is represented by curve B in Fig.1, and curves C and D in Fig. 2 show the variation of solubility at 20° and 5° respectively when the solution also contains 5 gms. sodium chlorate per 100 gms. of liquid water used to make up the solution (0.416 lb. sodium chlorate per gallon of water).

At low values of the sodium to boron ratio, for example to the left of point M in Fig. 1, the solid phase in equilibrium with a saturated solution is boric acid ($H_3BO_3$). Between points M and N of curve A (and corresponding points of the other curves) the equilibrium solid phase is sodium pentaborate ($NaB_5O_8 \cdot 5H_2O$). To the right of N in the figure the equilibrium solid phase becomes borax (sodium tetraborate decahydrate, $$Na_2B_4O_7 \cdot 10H_2O)$$

In the latter region, which extends to values of the molar ratio $Na_2O/B_2O_3$ somewhat less than unity, the curves represent the normal solubility of borax, and a solution that is represented by a point lying above (or to the right) of a curve will therefore be supersaturated with respect to borax under the conditions to which the curve pertains.

It is evident from Figs. 1 and 2 that in a range of the molar ratio $Na_2O/B_2O_3$ above about 0.25 (the actual limit varying with conditions) only a relatively small concentration of borax is normally taken into solution. Below 0.25 the normal solubility of borax rises rapidly to the univariant point N (curve A, for example). The peak in the solubility curve that includes the portion between points M and N is here referred to for convenience as the pentaborate peak.

One aspect of the present invention comprises the discovery that the enhanced borate solubility below a $Na_2O/B_2O_3$ ratio of about 0.25 can be utilized effectively in the production of borate solutions for weed control and the like. The increased solubility in that region represents potentially an increased concentration of $B_2O_3$ in solution. A given amount of solution thus is capable of carrying more borate than at a higher ratio. That means directly an increased potency of the solution for such a specific purpose as weed control.

A further advantage of the increased potential concentration of $B_2O_3$ in the region of the pentaborate peak results from the well known action of the borate as a fireproofing agent. Sodium chlorate, as is well known, supplements the weed killing action of the borate, but involves the possibility of fire hazard. Sodium chlorate can safely be added, in controlled amount, to a solution containing borate, since the borate will necessarily be deposited along with the chlorate when the solution is applied, as by spraying. The higher the concentration of borate that the solution can be induced to carry, the more chlorate can safely be added. Hence the increase in potential borate concentration at the pentaborate peak has the double advantage of directly increasing the amount of borate deposited from a given volume of solution, and of indirectly increasing the amount of chlorate that can safely be included in the solution.

A further advantage of employing solutions having a $Na_2O/B_2O_3$ ratio in the pentaborate peak region results from the fact that a given concentration of $B_2O_3$ in solution is more effective as a fireproofing agent for chlorate when the $Na_2O/B_2O_3$ ratio is relatively low. Thus, in the region described, a higher ratio of chlorate to borate can be used with safety than at the values of the molar ratio near unity, such as have previously been used. The factors described combine to make the general region of molar $$Na_2O/B_2O_3$$

ratio near 0.25 decidedly advantageous for weed killing solutions of borate, particularly when it is desired to add a maximum concentration of chlorate.

Solid compositions can be prepared which when dissolved directly and completely will yield a solution having a desired value of the ratio of $Na_2O/B_2O_3$. For example, a solid mixture of borax and boric acid in suitable proportions will accomplish that purpose for values of the ratio between 0.2 and 0.5, and the proportions of those two ingredients may be controlled in such a way as to give the desired ratio with considerable precision. In any such mixture of borax and boric acid it is preferred to maintain the ratio as high as is consistent with the enhanced solubility described above, since a higher $Na_2O/B_2O_3$ ratio means a larger proportion of borax, which is relatively inexpensive compared to boric acid. Furthermore the fireproofing effectiveness of the borate is a maximum near a ratio of 0.30.

A serious practical difficulty has been found in utilizing the peak of the solubility curve in the manner described above. That difficulty results from the fact that in commercial practice of controlling vegetation the step of dissolving the solid material is necessarily carried out under a wide variety of conditions, particularly of temperature. As may be seen at once from Figs. 1 and 2, the location of the solubility peak, considered as a function of $Na_2O/B_2O_3$ ratio, varies considerably both with the temperature of the solution and with the amount of sodium chlorate present in solution. Thus a solid composition, for example a mixture of solid borax and boric acid in such proportions as to have a molar ratio $Na_2O/B_2O_3$ of 0.25, can be completely dissolved in a suitable proportion of water at 20° C. to yield a satisfactory concentration of $B_2O_3$ (say, 6 gms. per 100 gms. $H_2O$). However, if the same composition were progressively added and dissolved in water at 5° C., only about 2.4 gms. $B_2O_3$ would be taken up per 100 gms. $H_2O$ before the solution became saturated with respect to borax. Upon further addition of the same composition, additional boric acid would dissolve, displacing the sodium to boron ratio of the solution downward. That displacement of the ratio would permit solution of some additional borax, but not the full amount added.

On the one hand, to avoid undissolved residue (which is objectionable in practice for obvious reasons) the amount of the solid composition added per gallon of water must be so far reduced when the water is cold that the resulting solution is too weak to be fully effective. On the other hand, if it is desired to provide a solution of uniform concentration at either 20° or 5°, the proportion of the described solid composition that is added must be increased at the low temperature (to provide enough boric acid to shift the ratio to less than 0.21). That necessarily results in a relatively large residue of undissolved borax, which is not only wasteful, but tends to cause serious inconvenience, for example by clogging spray nozzles. Actually, it is not feasible to complicate the preparation and use of weed killing solutions in either of the alternative respects just mentioned, so that in practice low water temperature results, under the typical conditions described, in a solution that is too weak to be fully effective and contains a considerable residue of solid borax.

Some advantages would result from the substitution, whenever low temperature conditions were encountered, of a special solid composition having a $Na_2O/B_2O_3$ ratio of about 0.20 instead of 0.25. That composition would dissolve readily in 5° water to give a $B_2O_3$ concentration of about 6 gms. per 100 gms. $H_2O$. However, such a procedure would be inconvenient, and is entirely impractical in ordinary commercial practice, and in any case would still have the serious disadvantage of consuming an unduly large proportion of boric acid.

When solutions including chlorate are considered, the situation is similar, but even more extreme. With 5 gms. chlorate per 100 gms. $H_2O$, the relatively very low $Na_2O/B_2O_3$ ratio of 0.16 or even 0.15 would be required to insure utilization of the pentaborate solubility peak at 5° C. That composition would then be quite unsuitable for use at higher temperatures. Not only would the large proportion of boric acid make the composition impracticably expensive, but with a sodium to boron ratio so far removed from 0.30, which gives optimum fireproofing effectiveness, the proportion of chlorate would probably have to be reduced in the interests of safety.

Some considerable improvement in the situation would result theoretically if it were commercially feasible to use hot water in preparing solutions of the type just described. The increased normal solubility at elevated temperatures would insure rapid solution of a suitable amount of the solid mixture, yielding a solution of the desired concentration. For example, 7 gms. $B_2O_3$ per 100 gms. $H_2O$ at a molar $Na_2O/B_2O_3$ ratio of 0.26 would lead to the solution represented by the point P in Fig. 1. If the solution were to cool during use to 5° (or even to 20°), it would become supersaturated with respect to borax. Such supersaturation would not necessarily mean appreciable precipitation of borax from solution, since the borates as a class are known to exhibit a metastable type of supersaturation which may hold for an appreciable time even in the presence of seed crystals.

However, the use of hot water for preparing weed killing solutions does not, in fact, constitute a satisfactory solution to the problems just outlined. Not only is equipment for heating water not usually available where the work is being done, but the cost of fuel, labor and maintenance would be a serious competitive disadvantage.

It has been discovered that solutions of the type described can be prepared satisfactorily under a wide variety of filled conditions, and that the described solubility peak can accordingly be effectively utilized, provided that the borax in the solid mixture to be dissolved is replaced by calcined borax. It is found that suitable mixtures of calcined borax and boric acid can be directly dissolved in water at normal temperature to a concentration which represents a high degree of supersaturation with respect to borax. Thus supersaturated solutions of the general type that might be produced by dissolving borax and boric acid in hot water and subsequently cooling the solution, can be produced directly by solution of suitable amounts of calcined borax and boric acid in cold water. The replacement of ordinary borax by calcined borax in solid compositions for the purpose described therefore meets the practical field problem of insuring complete solution of an adequate amount of borate under varying conditions of water temperature.

That result could scarcely have been expected, since calcined borax (containing 5 mols or less of water) readily becomes re-hydrated to the decahydrate (borax). It might therefore be expected that in contact with water, and especially during the process of solution, partially or wholly dehydrated borax would become re-hydrated to the decahydrate, and that a solution already fully saturated with borax would refuse to accept additional tetraborate into solution from any form of solid tetraborate, whether initially fully hydrated or not. Instead, it has been found that solid sodium tetraborate containing 5 mols of water or less exhibits a solution-forming behavior that is largely or entirely independent of the behavior of the decahydrate form of the same salt. The pentahydrate form of sodium tetraborate appears to go into solution entirely independently of the state of saturation of the solution with respect to the decahydrate form of the same salt. That behavior, for two salts differing only in their degrees of hydration, is analogous to the known behavior of salts comprising different molecular species. But the phenomenon is particularly surprising because, in direct contact with liquid water and at normal temperature, the less hydrated form of the salt would seem to become immediately fully hydrated. It is difficult to picture the mechanism by which a molecule of solid pentahydrate dissolves in water without passing through the form of solid decahydrate. Once transformed to decahydrate, the salt would obviously not dissolve in a solution already saturated with respect to borax. However that may be, it has been found that the anhydrous or pentahydrate form of sodium tetraborate can be directly dissolved at normal temperatures in an aqueous solution already saturated, or even very considerably supersaturated, with respect to borax.

That discovery provides a highly useful solution to the specific illustrative problem described above, namely, the production of borate solutions of adequate concentration for weed control purposes under practical field conditions. By employing calcined borax in the preparation of solid compositions for weed control, the pronounced peak in the borate solubility curve at $Na_2O/B_2O_3$ ratios near 0.25 can be effectively utilized in spite of relatively wide variations of water temperature. It is not necessary, in order to produce a relatively concentrated solution, that the $Na_2O/B_2O_3$ ratio be accurately adjusted to yield a composition lying at that peak for the particular water temperature used. Instead, it is sufficient that the ratio be displaced not too far to the high side of that peak, the permissible range being reasonably wide. Any composition having a ratio within that range can be dissolved directly to yield a solution having a concentration of $B_2O_3$ as high as, or even higher than, if borax had been used and the $Na_2O/B_2O_3$ ratio had corresponded with the solubility peak.

In Fig. 3 are represented several typical examples of solutions produced by the direct solution of such compositions of boric acid and calcined borax to produce solutions very considerably supersaturated with respect to borax. The solid curve in Fig. 3 represents the normal solubility of $B_2O_3$ at 10° C. (expressed as gms. $B_2O_3$ per 100 gms. of the entire solution) in a solution containing 5 gms. $NaClO_3$ per 100 gms. of liquid water. All solutions represented in the figure contain that amount of sodium chlorate in addition to the boron-containing substances. The point E represents the composition (determined by standard analytical methods) of a solution that was produced by directly dissolving in water at 10° C. 1.185 lbs. per gallon of a mixture of boric acid and calcined borax (containing 4.2 mols $H_2O$) having a computed molar $Na_2O/B_2O_3$ ratio of 0.276, together with the above stated amount of sodium chlorate. The solution, originally clear, began to show small crystals of borax about one hour after preparation. At that time analysis of the solution phase showed 1.45% $Na_2O$ and 6.08% $B_2O_3$, giving a ratio of 0.268. At that concentration, there is more than seven times as much $B_2O_3$ in solution as corresponds to a solution normally saturated with borax at the same $Na_2O/B_2O_3$ ratio. Yet that concentration resulted from direct solution of calcined borax and boric acid.

Other typical solutions prepared in a similar manner by the direct complete solution of measured amounts of sodium tetraborate, boric acid and sodium chlorate are represented by the points F and G. The tetraborate used in preparing those solutions was in the form of calcined borax containing 4.2 and 3.6 mols of water, respectively. The point H represents the solution obtained by dissolving a composition equivalent to that used for solution G, but with the tetraborate in the form of crystalline decahydrate. The amounts of solid material used for G and H were equivalent, allowance being made for the difference in water of hydration. Solution H did not take up all of the solid material added, and analysis of the solution phase after continuous agitation for 1 hour at 10° C. yielded the data represented by the point H. Although fully saturated, that solution is clearly not appreciably supersaturated with respect to borax.

By dissolving a somewhat larger proportion of the same solid mixture of boric acid and calcined borax that was used to give solution G, say, it is possible to obtain directly a solution of the composition represented by the point J. It will be noted that point J lies above the dashed projection of the section M'N' of the solubility curve, so that it corresponds to a solution that is supersaturated with respect to sodium pentaborate as well as with respect to borax.

The solution compositions here described as illustrations of the supersaturated solutions that may be prepared in accordance with the invention are intended particularly for spray application for vegetation control. The percentage of chlorate for that purpose, taking the specific solutions of Fig. 3 as typical instances, may be usefully expressed as a percentage of the dry ingredients of the composition. For convenience of reference, the following table gives the data upon which the points of Fig. 3 are based, with an added column, identified as "percent of dry solutes" and showing the chlorate content of each illustrative composition as a percentage of the total $NaClO_3$, $Na_2O$ and $B_2O_3$ in the resulting solution. The data given in the table may be obtained within the limits of measuring errors from the points of the figure.

| Composition | $Na_2O$ gm./100 gm. Sol. | $B_2O_3$ gm./100 gm. Sol. | Molar $Na_2O/B_2O_3$ | $NaClO_3$ gm./100 gm. $H_2O$ | Percent of dry solutes |
|---|---|---|---|---|---|
| E | 1.45 | 6.08 | 0.268 | 5.00 | 35.9 |
| F | 1.31 | 5.85 | 0.252 | 5.00 | 37.2 |
| G | 1.26 | 5.88 | 0.240 | 5.00 | 37.3 |
| H | 0.87 | 5.02 | 0.193 | 5.00 | 42.4 |
| J | 1.11 | 6.40 | 0.240 | 5.00 | 35.9 |

It will be seen that in the solution compositions represented by the points E, F, G, H and J the proportion of chlorate, expressed as percentage of total solutes on a dry basis, runs from about 35% to about 43%. Points on the normal solubility curve in Fig. 3 represent solutions for which the borate concentration is in most instances considerably less than the figures listed above, and for such solutions the chlorate percentage on total solutes is, of course, correspondingly increased. In Fig. 2, for example, the extreme peak of the normal solubility curve D for 5° C. represents a solution containing about 0.77 gm. $Na_2O$ and 4.88 gms. $B_2O_3$ per 100 gms. $H_2O$, as well as the 5 gms. $NaClO_3$ present in all solutions, giving about 47% chlorate on the dry basis.

In the production of solutions supersaturated with respect to borax by the direct solution of tetraborate, crystalline tetraborate pentahydrate ($Na_2B_4O_7 \cdot 5H_2O$) may be used in place of calcined borax. If calcined borax is employed, the degree of dehydration may vary over a wide range, so long as the material is substantially free of decahydrate. The presence of decahydrate does not directly prevent production of a supersaturated solution by the direct solution of the less hydrated tetraborate. But any decahydrate that may be present after the solution becomes saturated with respect to borax will not dissolve, and hence forms seed crystals of borax tending to break the supersaturation. However, as already indicated, even in the presence of borax crystals, precipitation of borax may be so slow that the formation of extreme supersaturation is not prevented. Such supersaturation may persist under favorable conditions for a matter of hours, often permitting full utilization of the solution.

Although the compositions specifically described above include boric acid, the $Na_2O/B_2O_3$ ratio may alternatively be lowered by means of a suitable borate such as sodium pentaborate ($NaB_5O_8 \cdot 5H_2O$), rather than by boric acid. For most commercial applications boric acid is usually preferable for economy and also because its use permits the direct production of solutions supersaturated with respect to pentaborate as well as borax (point J in Fig. 3). The procedure of directly dissolving calcined borax (or tetraborate pentahydrate) in a solution already saturated with respect to borax is not limited to the range of $Na_2O/B_2O_3$ ratio discussed above, but may be employed to produce solutions supersaturated with respect to borax at any sodium to boron ratio at which such solutions exist. For example, several illustrative but by no means extreme instances are represented in Fig. 4. The points denoted by crosses in Fig. 4 represent solutions formed respectively by solution of borax alone (ratio 0.5), borax and boric acid (ratio 0.4), and borax and sodium metaborate ($NaBO_2 \cdot 4H_2O$) (ratios 0.75 and 0.95). The solutions were shaken at 10° C. (at 20° C. for $Na_2O/B_2O_3$ ratio of 0.95) with an excess of borax present. The concentration of $B_2O_3$ was then determined by analysis, and is plotted as ordinate in the figure. Therefore the points represent the normal solubility of borax at the various ratios at those temperatures. The $Na_2O/B_2O_3$ ratios of the solutions are (except at ratio 0.5) slightly different from the ratios of the respective solid mixtures that were used to produce the solutions. That is because the borax in those compositions did not dissolve completely, while the other component did.

The points denoted by circles in Fig. 4 represent solutions produced by direct and complete solution (at the same respective temperatures) of measured quantities of calcined borax, alone, together with boric acid and with metaborate, respectively, to give the same respective values of the sodium to boron ratio for the added solute. Sodium perborate ($NaBO_3 \cdot 4H_2O$) can be used in place of or in combination with sodium metaborate. The latter salt may be either $NaBO_2 \cdot 2H_2O$ or $NaBO_2 \cdot 4H_2O$. Comparison of the corresponding pairs of points (crosses and circles) clearly shows the production of appreciable supersaturation with respect to borax by the direct solution of calcined borax over a wide range of $Na_2O/B_2O_3$ ratio.

The degree of supersaturation appears more striking in Fig. 3 than in Fig. 4 partly as a result of the rapid variation in the normal saturation curve at the pentaborate peak. If a solution such as is represented by the point G, for example, in Fig. 3 is brought from its state of supersaturation to a state of normal saturation by crystallization of borax, the point representing the resulting solution is approximately at H, not directly below G in the graph. That, of course, is because the crystals of borax coming out of solution have a greater $Na_2O/B_2O_3$ ratio (0.5) than the solution, so that not only the concentration of $B_2O_3$, but also the ratio $Na_2O/B_2O_3$ is reduced. Thus the degree of supersaturation of solution G is in one sense better represented by the distance GH (or perhaps by its vertical component) than by the vertical distance of G above the normal saturation curve.

In practice solutions can be effectively produced by direct solution of calcined borax, say, and they are stable enough for practical use, only within a limited degree of supersaturation. Definition of that degree may be considered in general to involve a difference in $Na_2O/B_2O_3$ ratio as well as a difference in $B_2O_3$ concentration. From that viewpoint, the degree of supersaturation of a given solution varies with temperature in part through the dependence upon temperature of the position of the pentaborate peak along the $Na_2O/B_2O_3$ axis. The range of $Na_2O/B_2O_3$ that is of practical value for producing supersaturated solutions by direct solution therefore varies, for example in the particular field of weed control compositions, with the temperature range that must, in usual commercial practice, be accommodated. The lower the minimum water temperature anticipated, the greater the degree of supersaturation that may result from solution of a given solid composition at given concentration. The higher that minimum temperature, the higher the $Na_2O/B_2O_3$ ratio of the solid composition can usefully be made. In general, it appears to be practicable under many conditions of use to employ solutions with molar $Na_2O/B_2O_3$ ratio at least as much as 0.08 or 0.10 higher than the ratio of the pentaborate peak. That means that where water temperatures of, say 10° C. are anticipated, the ratio for the solid composition including chlorate may well be as high as 0.28, or in some cases 0.30 (Fig. 3). If the water may be as cold as 5° C., the composition ratio should be somewhat lower, and may then usefully extend as low as 0.16 (Fig. 2). When chlorate is not included, all the ratios are somewhat raised, as evidenced by a comparison of Figs. 1 and 2.

The invention permits solutions of effective and uniform concentration to be made up by the complete solution of a uniform quantity of a single composition in a uniform quantity of water over a relatively wide range of water temperature. That is not only useful and convenient, but (for example in the illustrative field of weed control) may avoid a serious fire hazard. That is, if a solid mixture of borates and chlorate contains the maximum amount of chlorate that can safely be used under conditions leading to complete solution of the borates, then the failure of an appreciable amount of borate to dissolve may well produce a solution having an excessive and dangerous proportion of chlorate. That can easily occur if the borate in the mixture does not have the described property of dissolving in a solution already saturated with respect to borax. Such a mixture, if added to cold water in the same proportion that would dissolve readily in warmer water, may well leave an appreciable residue of undissolved borate, and so produce a solution the use of which involves serious fire hazard. The present invention avoids that risk over a wide temperature range.

Quite apart from the great advantage of permitting convenient solution of a uniform composition in uniform and effective proportions over a relatively wide range of temperature, the invention has the advantage that at any given water temperature the sodium to boron ratio of the solid composition can be appreciably higher than would otherwise be possible, without any reduction in the concentration of the resulting solution. For example, a composition with molar ratio 0.28 can be dissolved in a chlorate solution at 10° C. to a concentration of 6% $B_2O_3$ (point E of Fig. 3). Not only does that permit full utilization of the pentaborate solubility peak without the expense of the full amount of boric acid that would be needed to actually reach that peak; but it permits maintaining the sodium to boron ratio close to the ideal value (0.30) for maximum fireproofing efficiency without any reduction of the concentration of $B_2O_3$ in solution.

I claim:

1. A solid composition of matter comprising a mixture of sodium tetraborate and a substance selected from the class comprising boric acid, sodium pentaborate, sodium metaborate and sodium perborate, said composition being capable of dissolving directly in water to produce a solution appreciably supersaturated with respect to borax; the sodium tetraborate in the mixture containing between 0 and 5 mols, inclusive, of water of hydration per mol of tetraborate.

2. A solid composition of matter as defined in claim 1 and in which the said substance is boric acid.

3. A solid composition of matter as defined in claim 1 and in which the said substance is sodium pentaborate.

4. A solid composition of matter as defined in claim 1 and in which the said substance is sodium metaborate.

5. A solid composition of matter as defined in claim 1 and in which the sodium tetraborate is calcined borax.

6. A solid composition of matter comprising a mixture of boric acid and sodium tetraborate, and capable of dissolving directly in water to produce a solution appreciably supersaturated with respect to borax, the sodium tetraborate in the said mixture being in the form of calcined borax containing between 0 and 5 mols, inclusive, of water of hydration per mol of tetraborate.

7. A solid composition of matter comprising a mixture of boric acid and sodium tetraborate, and capable of dissolving directly in water to produce a solution appreciably supersaturated with respect to borax, the sodium tetraborate in the said mixture being in the form of calcined borax containing between 0 and 5 mols, inclusive, of water of hydration per mol of tetraborate, and the ratio of calcined borax to boric acid being such that the overall molar ratio of $Na_2O$ to $B_2O_3$ in the mixture has a value between about 0.16 and about 0.30.

8. A solid composition of matter comprising a mixture of sodium chlorate, boric acid and sodium tetraborate, and capable of dissolving directly in water to produce a solution appreciably supersaturated with respect to borax, the sodium tetraborate in the mixture containing between 0 and 5 mols, inclusive, of water of hydration per mol of tetraborate.

9. A solid composition of matter, comprising a mixture of sodium chlorate, boric acid and calcined borax, the calcined borax in the mixture containing between 0 and 5 mols, inclusive, of water of hydration per mol of tetraborate, and the ratio of calcined borax to boric acid being such that the overall molar ratio of $Na_2O$ to $B_2O_3$ in the mixture has a value between about 0.16 and about 0.30.

10. A solid composition of matter comprising a mixture of boric acid and sodium tetraborate for which the ratio $Na_2O/B_2O_3$ has a predetermined value, said composition being capable of dissolving directly in water at a temperature for which the $Na_2O/B_2O_3$ ratio of the pentaborate solubility peak is appreciably lower than the said value, and capable, by so dissolving, of producing a solution supersaturated with respect to borax and having a concentration of $B_2O_3$ substantially equal to the normal solubility of $B_2O_3$ at the said solubility peak at the said temperature; the sodium tetraborate in the said mixture containing between 0 and 5 mols, inclusive, of water of hydration per mol of tetraborate.

GEORGE A. CONNELL.

References Cited in the file of this patent

UNITED STATES PATENTS

| Number | Name | Date |
|---|---|---|
| 2,096,266 | Suhr | Oct. 19, 1937 |

OTHER REFERENCES

Mellor, Comprehensive Treatise on Inorganic and Theoretical Chemistry, vol. 5, pp. 66 and 67 (1924).

Montana Agr. Exp. Sta. War Circular No. 2 (1943), (10 pages).